UNITED STATES PATENT OFFICE.

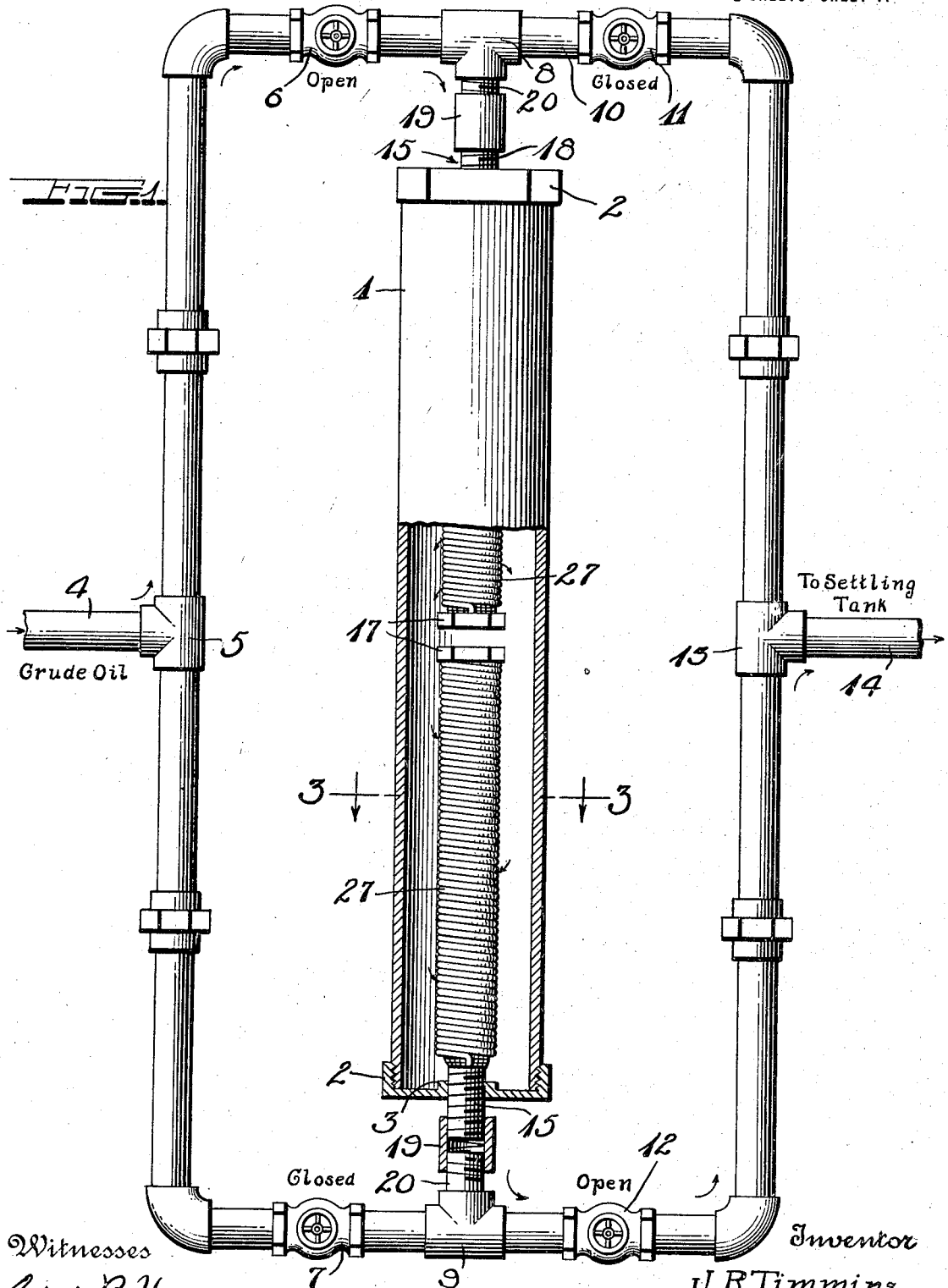

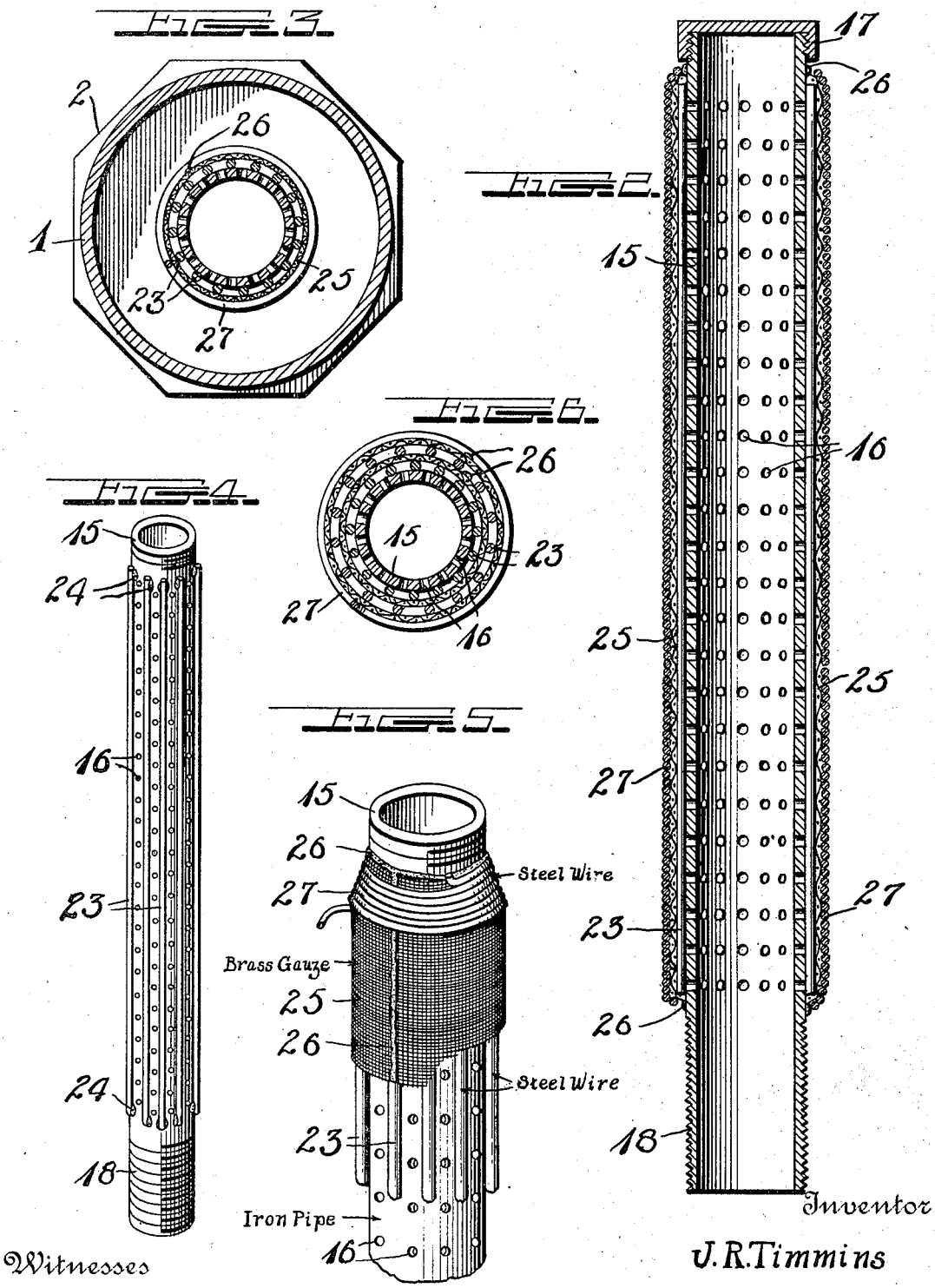

JAMES R. TIMMINS, OF OKMULGEE, OKLAHOMA, ASSIGNOR OF ONE-FOURTH TO ORLANDO SWAIN, OF OKMULGEE, OKLAHOMA.

OIL-SEPARATOR.

1,279,611.

Specification of Letters Patent.  Patented Sept. 24, 1918.

Application filed March 22, 1915.  Serial No. 16,110.

*To all whom it may concern:*

Be it known that I, JAMES R. TIMMINS, a citizen of the United States, residing at Okmulgee, in the county of Okmulgee and State of Oklahoma, have invented certain new and useful Improvements in Oil-Separators; and I do declare the following to be a full, clear, and exact description of the invention, such as will enable others skilled in the art to which it appertains to make and use the same.

The present invention relates to the treatment of oily materials, and in particular to such oily materials as contain oil and water, in a condition in which they will not readily separate. The process involves the treatment of the oily material, by passing the same through a conditioning device, of such a nature as to render the oil and water readily separable, by gravity. By this process I may treat such materials as "B. S.", oil containing "B. S.", asphaltic oil containing "B. S.", oil containing sulfur, and many other oils containing various impurities.

The present application is in part a continuation of my copending application Serial No. 747,503, filed Feb. 10, 1913.

The accompanying drawing shows a device suitable for use in carrying out my process. In said drawings:—

Figure 1 is an elevation of a particular form of conditioning device of simple construction, said figure being partly in section to show its interior, the casing being connected up with the inlet and delivery pipes so as to show the operation of the whole.

Fig. 2 is an enlarged central longitudinal section of one of the cylinders within said casing.

Fig. 3 is a cross section on the line 3—3 of Fig. 1.

Fig. 4 is a perspective detail of the tubular core of one of said cylinders; and Fig. 5 is an enlarged perspective detail of the upper end thereof with the gauze and retaining wire in place.

Fig. 6 is a horizontal section through an amplified or reinforced form of the cylinder, intended for use where the oil is quite dense, the impurities considerable, or the pressure great.

It will be noted that while I have illustrated this particular structure, the invention is a process which may be carried out by the use of this or various other forms of apparatus.

It is well known that oil-refining devices and stills are injured by deposits which accumulate therein and are brought in by the crude oil being refined or treated. These deposits are in part solid sulfur, asphalt, and other impurities, especially what is commonly called "B. S." and by my improved process, these can be removed from the oil before it is conducted to the refinery whereby the latter is relieved of the injurious effect of such impurities. But the oil at this time is in a heavy and thick state, dirty, gummy, and difficult to treat, and if handled by a process of gravity filtration to remove the impurities, the latter soon foul the filter, and filters will not remove all the objectionable materials. In any case, the greater or the heavier the impurities, the greater the force pressure necessary to drive the liquid through a filter; and the greater the force employed and resistance thereto, the stronger must the device be in order to perform its work successfully. These known conditions have given rise to the production of my improved separator, now to be described.

The numeral 1 designates a casing, preferably a large-sized tube or pipe which is preferably made of steel, and 2 are steel caps which close its ends as by being screwed thereon as shown, each cap by preference having a threaded nipple 3 through its center. In Fig. 1 I have shown but a single casing connected up with an inlet pipe 4 whereby the liquid to be treated is admitted, passed through a T-coupling 5, and then through branches having valves 6 and 7 by which it may be admitted to either end of said casing and the separators contained within the same. The branches of the inlet pipe after passing through the valves 6 and 7 are connected by T-couplings 8 and 9 with the opposite extremities of the casing in a manner to be described below; and the pipes 10 leading from the other side of said T-couplings may be said to be branches of the outlet. These branches pass respectively through globe valves 11 and 12, and then unite in a T-coupling 13 with the main outlet 14 in a manner which will be clear. While I have shown but a single casing 1 as connected up by its T-couplings 8 and 9 with the system of piping illustrated on Sheet 1 of the drawings, it will be clear that a gang of said casings 1 might be connected up by merely amplifying the system of piping and the controlling valves therefor, so long as the direction of the flow of the liquid to be treated through each casing could be controlled at will. Said casings may be in series or in parallel.

Disposed within each casing are two cylinders, whereof one is shown in section in Fig. 2. This is composed of a tube which may well be a pipe 15 made, for example, of iron, of say two inches in diameter and slitted or perforated as at 16, these perforations may consist of round holes, of about one sixteenth of an inch diameter, said pipe being threaded at its upper end to receive an imperforated cap 17 by which this end is closed, and having a long unperforated threaded lower end 18 which may be connected by means of a coupling or union 19 with another short section of pipe or nipple 20 screwing into one of said T-couplings 8 or 9 as seen in Fig. 1. There are two of these perforated pipes 15, and their long threaded ends 18 are screwed through the threaded nipples 3 of the caps on the casing, so that their own caps 17 stand at about the mid-length of said casing and preferably out of contact with each other as shown in Fig. 1. Disposed longitudinally upon the outer surface of, and soldered to said pipe 15, are wires 23, which may be steel wires about three-sixteenths of an inch in diameter. In Fig. 4 is shown the core thus built up, the numeral 24 designating the solder which I place by preference at the ends of the wires only so that it will not cover any of the perforations 16. Around the core thus constructed I wrap a sheet 25 of wire gauze of brass or copper, for example No. 40, having about forty meshes to the linear inch drawing it very tightly as it is wrapped and soldering its edge as seen at 26. Around the single or several separated convolutions of this gauze I wrap a helical retaining wire, for example a No. 18 steel wire, the successive convolutions being almost in contact with each other as seen at 27, and secure its ends in any suitable manner. The amplification of the idea shown in Fig. 6 merely contemplates additional wires 23 and layers of gauze 25 before the helical retaining wire 27 is applied; and obviously this type of cylinder could be made on a larger scale and subjected to greater pressure or could be employed with liquid which contains a high percentage of impurities. The size of the mesh in the wire cloth will depend in a measure on the liquid to be filtered and on the number of convolutions or layers of said cloth which are wound around the core.

The operation of this device is as follows: One or more of the casings, each with its pair of separating cylinders, being connected up with the pipes as shown on Sheet 1 of the drawings, the operator opens the valves 6 and 12 and closes the valves 7 and 11; and then when the liquid is admitted through the inlet pipe 4 it follows the course indicated by the arrows in Fig. 1. It is to be understood that the oil is passed through this course under considerable pressure, say about 100 pounds per square inch. Pressure from the interior will tend to open the meshes of the gauze and separate the convolutions of the retaining wire, whereas pressure from the exterior will tend to close the same. As the oil enters the uppermost cylinder and passes from its interior outward into the casing, and then passes from the latter inward into the bore of the lowermost cylinder shown in Fig. 1, greater pressure is obviously required at the lower end of the device there illustrated, and the lowermost of the two separators therefore produces the chief results claimed for this device. The original globules or particles of oil ingredients are minute drops contained or wrapped in an asphalt coat or body. By driving the oil through the separator under great pressure, a disintegration of the oil globules takes place. The material then passes to a settling tank.

The treated oil looks like the untreated oil, but if allowed to stand, the water and some of the impurities will settle out, more readily than would happen in the untreated oil. Without limiting myself to any particular time of settling, I will state that one week has been found generally sufficient.

After settling, the oil and impurities will not again resume the original form or consistency of the crude oil, but the several ingredients will remain in the settling tank in layers according to the specific gravity of each. The injurious ingredients that would otherwise accumulate in the stills and other parts of the refining plant, are retained in the settling tank, and not in the separator. A small per cent. of certain impurities, such as coarse particles of solid matter, might be retained in the separator cylinders but it is the intention that substantially the whole mass is to pass through the separator and then be deposited in a tank for settling purposes.

From crude oil several products are obtained by the usual process of refining, viz: gasolene, illuminating oil, asphalt, etc.

Somewhat similar settling results have heretofore been obtained by the introduction into the crude oil of certain chemicals and by heating the crude oil. The purpose of the present invention is to obtain similar but better results without the use of chemicals, steam, or heat. Under existing processes in order to settle the crude oil it is heated to a temperature of from 100 to 110 degrees F., which results in the driving off and loss of certain gases. By the use of this improved separator the oil is treated cold and all such gases as would be driven off by heating are saved, the process of refining is hastened, the damages done to the stills and other machinery used in refining oil are prevented; results are produced much more cheaply than by other methods now in use; and the separator is much more convenient to use and less expensive to construct in the first instance, and saves certain oil products that are lost in processes now used.

I have purposely omitted any description of the theory of operation of this process, since I do not limit the invention to any particular theory of operation.

What I claim as new is:

A device for separating impurities from oil comprising a perforated core into which oil is adapted to be forced, a gauze material surrounding said core and spaced therefrom, said perforations and said gauze forming interstices through which the oil is adapted to pass and whereby the oil globules are disintegrated.

In testimony whereof I have hereunto set my hand in presence of two subscribing witnesses.

JAMES R. TIMMINS.

Witnesses:
ORLANDO SWAIN,
R. E. GRIFFITH.